United States Patent [19]
Goforth

[11] 3,807,079
[45] Apr. 30, 1974

[54] WEEDLESS AND ANTI-SNAGGING FISHHOOK

[76] Inventor: David L. Goforth, 613 Kemp Rd., West, Greensboro, N.C.

[22] Filed: July 6, 1972

[21] Appl. No.: 269,486

Related U.S. Application Data

[63] Continuation-in-part of Ser. No. 168,416, Aug. 2, 1971, abandoned, which is a continuation of Ser. No. 843,547, July 22, 1969, abandoned.

[52] U.S. Cl................ 43/42.17, 43/42.28, 43/42.37, 43/42.43, 43/43.4, 43/43.6
[51] Int. Cl............................................. A01k 85/00
[58] Field of Search............ 43/42.42, 42.43, 42.37, 43/43.6, 42.4, 43.2, 43.4, 43.6, 42.17, 42.28

[56] References Cited
UNITED STATES PATENTS

| | | | |
|---|---|---|---|
| 719,704 | 2/1903 | Trakel | 43/43.6 |
| 1,778,214 | 10/1930 | Fisher | 43/42.43 X |
| 2,765,572 | 10/1956 | Woolfe | 43/42.37 |
| 3,142,928 | 8/1964 | Adams | 43/42.42 X |
| 2,309,902 | 2/1943 | Harvey | 43/42.37 X |
| 847,266 | 3/1907 | Upton | 43/42.43 X |
| 1,377,309 | 5/1921 | Chapel | 43/42.43 X |

*Primary Examiner*—Louis G. Mancene
*Assistant Examiner*—Daniel J. Leach

[57] ABSTRACT

A weedless, anti-snagging fishhook for use per se or in combination with various types of artificial lures having shank and hook bill portions offset relative to each other with a projecting finger having a portion offset with respect to and spaced from the barb of the hook bill portion for deflecting or twisting the fishhook away from weeds or other obstacles to prevent fouling and snagging of the hook.

7 Claims, 11 Drawing Figures

PATENTED APR 30 1974 3,807,079

3,807,079

WEEDLESS AND ANTI-SNAGGING FISHHOOK

BACKGROUND OF THE INVENTION

This application is a continuation-in-part of copending application Ser. No. 168,416, filed Aug. 2, 1971, now abandoned, which is a continuation of application Ser. No. 843,547, filed July 22, 1969, now abandoned.

Weedless fishhooks are well known in which the hook is equipped with several deflector fingers which are secured to the hook shank in such a way as to extend outwardly on each side of and across the plane of the hook bill. The deflector fingers normally are formed of metal wire construction secured to the hook shank adjacent the eye.

SUMMARY OF THE INVENTION

The following invention relates to a weedless and anti-snagging fishhook which may be used in combination with various types of artificial lures having a single projecting deflector finger extending outwardly and rearwardly from the hook shank. The deflector finger is of a resilient, transparent, thermoplastic material secured at one end adjacent the eye of the hook shank with the other end being spaced suitably from the hook bill to provide the necessary anti-snagging guard.

The fishhook comprises a straight shank having a hook bill and barb offset to one side of the shank such that the tip of the barb terminates substantially in a plane through the shank.

In one preferred embodiment, the thermoplastic finger is secured in position by plastic or other suitable waterproof material and comprises a first portion extending outwardly radially beyond the hook barb and a second portion bent and twisted at an angle with respect to the first finger portion in the hook shank, and terminating outwardly and rearwardly beyond the forwardmost tip of the barb. Due to the angular relationship of the barb and the deflector finger, weeds or other underwater objects are prevented from snagging the hook.

In another embodiment, the thermoplastic finger extends outwardly and rearwardly towards the hook barb in a continuous curve such that when the hook is advanced through the water and the guard finger encounters an obstacle, the deflector finger or guard twists or rotates the hook turning the barb away from the obstacle.

DETAILED DESCRIPTION OF THE INVENTION

Figure 2:
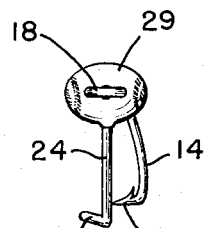
FIG. 2 is a front view of the hook of FIG. 1.
Figure 1:
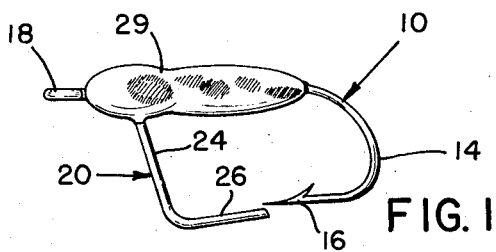
FIG. 1 is a side elevational view of a weedless and anti-snagging fishhook of one embodiment of this invention.

Referring now more particularly to FIGS. 1-4 of the drawing, the numeral 10 designates an improved fishhook having a shank portion 12 provided with a twisted, offset hook bill 14 which terminates in a barb 16 on one end, and is provided with an eyelet 18 on the opposite end. A projecting weed deflector finger 20 formed of a single length of thermoplastic material is secured by a series of windings 28 about finger portion 22 to the shank 12 of fishhook 10.

Figure 4:
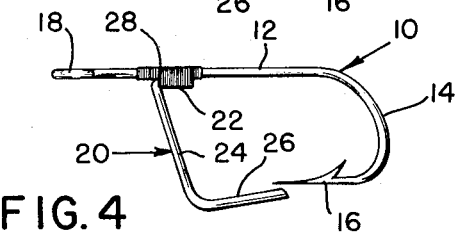
FIG. 4 is a side elevational view of the fishhook of FIG. 1 illustrating the preliminary stages of fabrication.
Figure 3:
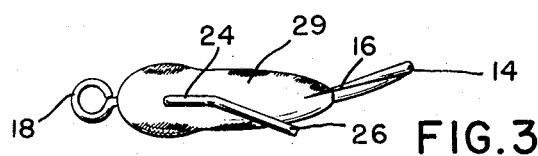
FIG. 3 is a bottom view of the hook of FIG. 1.

The finger 20 is secured in spaced relation to the barb 16 to permit a fish to take the hook unimpaired while still protecting the hook 10 from weeds and other underwater objects as the hook is drawn through the water. The finger 20 extends rearwardly from the shank 12 and terminates in a portion 26 positioned in spaced relation with respect to barb 16. Finger portion 24 is disposed in a plane that intersects at an acute angle a plane extending through shank 12. Finger 20 terminates in a portion 26 bent and twisted with respect to portion 24 so as to extend across in front of and beyond the barb 16 of the hook bill 14, as shown by FIGS. 3 and 4. Finger 20 comprises a first portion 24 extending substantially radially outwardly from shank 12 to a point slightly beyond the radial distance between barb 16 and shank 12 and a second portion 26 that is bent inwardly toward shank 12 to form an angle within the range of approximately 80° – 120° with respect to portion 24 and is twisted toward barb 16 to an angle within the range of approximately 15° – 30° with respect to a plane passing through the shank 12 and finger portion 24. Offset portion 26 terminates just below and beyond barb 16 as most clearly shown by FIGS. 4 and 3, respectively.

The deflector finger 20 is made of thermoplastic material, such as nylon, which is preferably clear and of monofilament construction. The finger 20 is sufficiently resilient to be deflected by a fish but sufficiently rigid to deflect the hook from weeds and other underwater objects to prevent fouling and snagging of the hook 10. Various deniers or gauges of thermoplastic material may be used, but an untwisted monofilament is preferred.

In the construction of the weedless fishhook, the portion 22 of finger 20 is bound in position against shank 12 by windings 28 of suitable binding material which may be nylon thread, gut, or wire, as desired. A suitable covering 29 of plastic or other waterproof material is coated on windings 28 to protect the windings and maintain the deflector finger in position with respect to the hook bill. Note that in FIGS. 1-3, the plastic or waterproof coating 29, which may vary in shade or color, is extended along the shank 12 and formed to resemble an insect.

Figure 5:
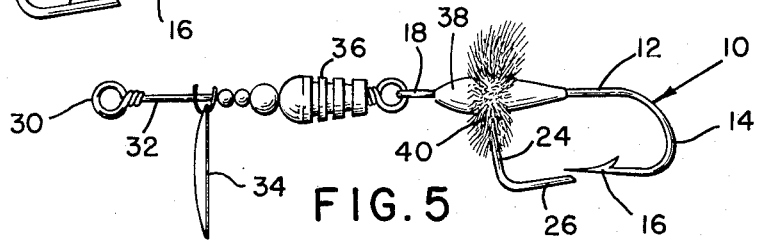
FIG. 5 is a side elevational view of a modified embodiment of a weedless and anti-snagging fishhook shown in combination with an artificial lure.

The weedless and anti-snagging fishhook 10 may be used by itself or in combination with various types of artificial lures. FIG. 5 illustrates a weedless fishhook of the invention in combination with an artificial lure and swivel 36 having a spinner 34 attached thereto for rotation on shank 32 provided with an eye 30 at one end. Feathers or hairs 40, provided to camouflage the finger 20 and barb 16, are retained in position adjacent finger 20 by securing member 38.

Figure 6:
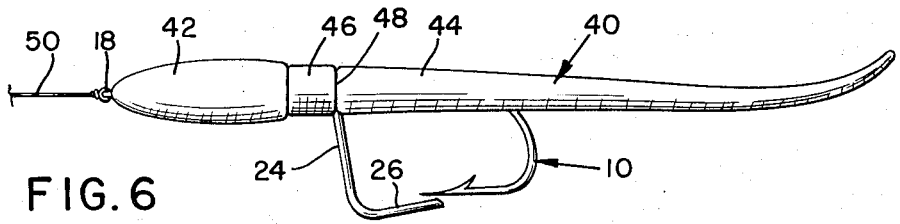
FIG. 6 is a side elevational view of the fishhook in combination with a plastic worm-like lure.

The lure 40 illustrated in FIG. 6 comprises a wormlike body of articulated portions 42, 44, and 46 in which the weedless hook bill extends from body portions 44 and the deflector finger 20 extends between portions 44, 46. The forward portion 42 of lure 40 is the hook eye 18 extending therefrom, through which a line 50 is secured.

Figure 7:
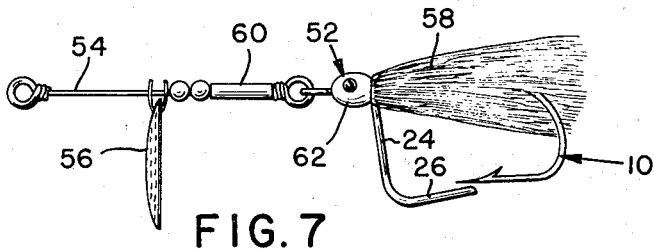
FIG. 7 is a side elevational view of the weedless and anti-snagging fishhook in combination with an artificial lure having a spinner and camouflaging bristles.
Figure 8:
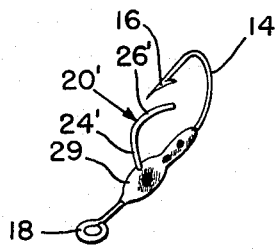
FIG. 8 is a perspective view of another embodiment of the weedless and anti-snagging fishhook of this invention.
Figure 9:
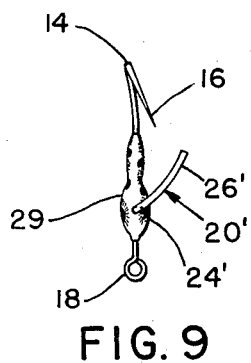
FIG. 9 is a top plan view of the hook of FIG. 8.
Figure 10:
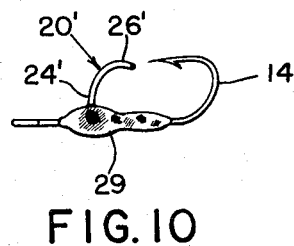
FIG. 10 is a side elevational view of the hook of FIG. 8.
Figure 11:
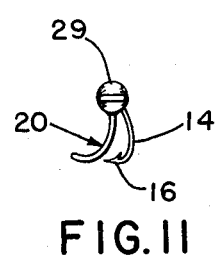
FIG. 11 is a front elevational view of the hook of FIG. 8.

Referring to FIG. 7, a further embodiment of an artificial lure 52 is shown wherein hook 10 having deflector finger 20 is secured to leader 60 that is provided with a spinner 56 for rotation on shank 54 of the lure. Feathers or bristles 58 are secured to hub 62 adjacent hook eye 18 for camouflaging the hook beyond deflector finger 20.

It will be seen from the foregoing that by providing the deflector finger 20 so that terminal portion 26 crosses over a plane extending through the barb 16, as shown by FIG. 3, and extends from the shank to a distance radially beyond the barb 16, the hook is prevented from fouling and snagging on weeds or other objects.

FIGS. 8–11 relate to a modified embodiment of the weedless and anti-snagging fishhook of this invention wherein the deflector finger 20' extends outwardly and rearwardly in a continuous, smooth curve. The shank, hook bill, barb, eyelet and plastic coating or body for the shank are substantially identical to those described in conjunction with FIGS. 1–4. However, it is to be understood that the weedless fishhook with the continuous curved deflector finger 20' may be used in combination with various types of artificial lures as illustrated by FIGS. 5–7.

The deflector finger 20' preferably is formed of thermoplastic material similar to the finger 20. As shown by FIGS. 8–11, the finger 20' extends outwardly from the shank 12 and rearwardly towards the barb 16 in a continuous, gentle curve. The curve may be retained in the finger 20' by heat setting the thermoplastic material.

A first portion 24' of the curved finger 20' near the shank extends outwardly therefrom and is positioned forwardly of and generally in alignment with the hook bill 14 and barb 16. The opposite end of the curved finger 20' terminates in a second portion 26' which is offset with respect to the barb 16, and crosses in front of the barb in spaced relation thereto.

The tensile strength of the finger 20' is such that it prevents snagging of the hook when obstacles are encountered, but can be deflected inwardly or to a side to expose the hook barb 16 when pressure is applied by a fish to opposite sides of the hook.

The hook of FIGS. 8–11 tends to twirl through the water due to the angle of the curved finger 20' and can crawl through brush or around other objects due to the tendency of the hook to rotate. The gentle curve of the finger 20', when contacting an object, causes the fishhook to function similar to the principle of an auger or corkscrew diverting the hook by sliding, twisting, crawling over, around or through obstacles and turning the hook barb 16 away from obstacles.

I claim:

1. A weedless anti-snagging fishhook comprising a shank having an eyelet at one end and a hook bill terminating in a barb at the other end, a discrete, resilient deflector finger secured to said shank adjacent said eyelet and extending outwardly and rearwardly towards said barb, said finger including a first portion extending outwardly from said shank forwardly of and generally in planar alignment with said barb and a second portion directed inwardly generally parallel to said shank and defining an angle within the range of 80°–120° with respect to said first portion, said second portion being twisted and extending in a first plane at an angle within the range of 15°–30° with respect to a second plane passing axially through said shank and said first finger portion, said second portion extending rearwardly and passing in front of said barb in spaced relation thereto, said hook bill and said barb being twisted and offset with respect to said shank and lying in a third plane intersecting said first and said second planes, said deflector finger, upon contacting an obstacle during movement of the fishhook, rotating said hook bill and said barb away from the obstacle to prevent snagging of the fishhook, said finger being deflected inwardly or to a side to expose the barb when pressure is applied by a fish.

2. A weedless, anti-snagging fishhook as claimed in claim 1, wherein said deflector finger is of transparent, thermoplastic construction.

3. A weedless, anti-snagging fishhook as claimed in claim 2, said finger being of monofilament nylon.

4. A weedless, anti-snagging fishhook as claimed in claim 1, said deflector finger being formed from a single length of thermoplastic material having a portion in juxtaposition to and secured to said shank by a series of windings.

5. A weedless, anti-snagging fishhook as claimed in claim 4, said windings and at least a portion of said shank being covered with a waterproof material forming a lure.

6. A weedless, anti-snagging fishhook as claimed in claim 1, and further including a spinner secured in spaced relation to said deflector finger, and camouflaging means for partially concealing said hook.

7. A weedless, anti-snagging fishhook comprising a shank having an eyelet at one end and a hook bill terminating in a barb at the other end, a discrete, resilient deflector finger secured to said shank adjacent said eyelet and extending outwardly from said shank and rearwardly towards said barb, in a continuous curve, said continuous curve finger including a first portion extending outwardly from said shank generally in alignment with said hook bill and barb and a second portion offset with respect to said barb and crossing in front of said barb in spaced relation thereto, said hook bill and barb being twisted and offset with respect to said shank and lying in a plane intersecting a plane passing through said continuous curved finger second portion, said deflector finger, upon contacting an obstacle during movement of the fishhook, rotating said hook bill and said barb away from the obstacle to prevent snagging of the fishhook, said finger being deflected inwardly or to a side to expose said barb when pressure is applied by a fish.

* * * * *